United States Patent
Moisson, Jr. et al.

(10) Patent No.: US 10,753,189 B2
(45) Date of Patent: Aug. 25, 2020

(54) CONTROLLING WELLBORE PATHWAYS BY MANIPULATING THE SURFACE AREA TO MASS RATIO OF THE DIVERTING MATERIAL

(71) Applicants: John A. Moisson, Jr., Town and Country, MO (US); Nicholas Koster, Westminster, CO (US)

(72) Inventors: John A. Moisson, Jr., Town and Country, MO (US); Nicholas Koster, Westminster, CO (US)

(73) Assignee: DPIP, LLC, Ellisville, MO (US)

( * ) Notice: Subject to any disclaimer, the term of this patent is extended or adjusted under 35 U.S.C. 154(b) by 0 days.

(21) Appl. No.: 16/109,107

(22) Filed: Aug. 22, 2018

(65) Prior Publication Data

US 2018/0363440 A1    Dec. 20, 2018

Related U.S. Application Data

(60) Provisional application No. 62/550,538, filed on Aug. 25, 2017.

(51) Int. Cl.
| | |
|---|---|
| *E21B 43/26* | (2006.01) |
| *C09K 8/516* | (2006.01) |
| *C09K 8/42* | (2006.01) |
| *C09K 8/508* | (2006.01) |
| *C04B 40/00* | (2006.01) |
| *C09K 8/506* | (2006.01) |

(52) U.S. Cl.
CPC ........ *E21B 43/261* (2013.01); *C04B 40/0092* (2013.01); *C09K 8/426* (2013.01); *C09K 8/506* (2013.01); *C09K 8/508* (2013.01); *C09K 8/516* (2013.01)

(58) Field of Classification Search
None
See application file for complete search history.

(56) References Cited

U.S. PATENT DOCUMENTS

| | | | |
|---|---|---|---|
| 6,720,292 B1* | 4/2004 | Zhou | C09K 8/5045 507/200 |
| 2008/0093073 A1* | 4/2008 | Bustos | C09K 8/68 166/279 |
| 2009/0025932 A1* | 1/2009 | Panga | C09K 8/80 166/278 |
| 2010/0137169 A1* | 6/2010 | Pope | C08F 8/00 507/205 |
| 2010/0193244 A1* | 8/2010 | Hoskins | C09K 8/035 175/5 |
| 2010/0300688 A1* | 12/2010 | Panga | C09K 8/80 166/280.2 |

(Continued)

FOREIGN PATENT DOCUMENTS

WO    WO2015134007    * 9/2015    ............. E21B 43/22

*Primary Examiner* — Anuradha Ahuja
(74) *Attorney, Agent, or Firm* — The Kubiak Law Firm

(57) ABSTRACT

A mixture of at least two shapes of a dissolvable diverter material. The shapes range from a flake having a high surface area to mass ratio to beads having a low surface area to mass ratio. The density of the various shapes may be manipulated by including voids or low-density materials within the shape. The density manipulation allows matching the transport properties of the at least two shapes to the transport fluid so that both shapes may arrive at the desired location at the desired time.

12 Claims, 3 Drawing Sheets

(56) References Cited

U.S. PATENT DOCUMENTS

| | | | |
|---|---|---|---|
| 2010/0311623 A1* | 12/2010 | Rey | C09K 8/68 |
| | | | 507/259 |
| 2010/0323932 A1* | 12/2010 | Bustos | C09K 8/26 |
| | | | 507/219 |
| 2014/0060831 A1* | 3/2014 | Miller | E21B 43/267 |
| | | | 166/280.1 |
| 2016/0319184 A1* | 11/2016 | Nguyen | C09K 8/62 |

* cited by examiner

CONTROLLING WELLBORE PATHWAYS BY MANIPULATING THE SURFACE AREA TO MASS RATIO OF THE DIVERTING MATERIAL

CROSS-REFERENCE TO RELATED APPLICATIONS

This application claims priority to U.S. Provisional Patent Application No. 62/550,538 that was filed on Aug. 25, 2017.

BACKGROUND

Over the lifetime of a well there are many instances when it may be desirable to temporarily seal certain pathways in order to open others. One of those instances may be during a frac operation such as in plug and perf.

In a plug and perf operation, the operator begins by assembling a perforating tool on the surface. The perforating tool typically incorporates a plug on the lower end. The plug, once moved into position and set, will lock into the casing walls and form a fluid tight seal preventing fluid from moving past the plug. Just above the plug is a setting tool. The setting tool, once actuated, moves the plug from an unset position where the plug can be run into the well to a set position where, as previously mentioned, the plug locks into the casing and blocks fluid flow. Just above the setting tool is the perforating gun. The perforating gun usually but not always consists of one or more shaped charges that, upon detonation, will form holes in the casing wall. Any type of perforating gun may be used, including other perforating tools such as jetting tools, etc.

Once assembled on the surface the perforating tool and plug are run into the well to the desired depth. At the desired depth the setting tool is actuated to move the plug from its unset position to its set position locking the plug into place. The setting tool then disconnects from the plug. After disconnection the setting tool and the perforating gun are raised to some point above the now set plug, preferably to a location adjacent to a hydrocarbon formation. Once the perforating gun is in place the perforating gun is actuated thereby forming holes or perforations through the casing wall. The perforating gun and setting tool are then usually but not always removed from the wellbore.

With the perforating gun and setting tools removed from the wellbore the well may be fractured through the perforations formed by the perforating gun. Fracturing usually occurs by pumping high-pressure fluid through the casing to the plug. The plug prevents the fluid from further downward flow as the plug forms a fluid tight seal and is locked to the casing. High-pressure fluid then flows laterally outward through the holes in the casing.

It is generally understood that the high-pressure fluid will follow the path of least resistance. Meaning in practice that the high-pressure fluid once it begins a fracture through one or more of the perforations the rest of the fluid tends to follow through that initial fracture and fails to create other fractures in the formation. Therefore, it is generally desirable, at some point, to temporarily seal off the initial flow path so that the high-pressure fluid may form additional fractures within the formation thereby rendering a more complete frac job which gives better access to the hydrocarbons within the hydrocarbon bearing formation.

In another instance it may be desirable to at least temporarily block all of the initial perforations and other leak points within the wellbore. Such a situation may arise when after the well has been produced for some period of time the hydrocarbon production begins to taper off to a point where it is no longer economically feasible to produce the well. In such an instance new fractures within the well are needed to access different portions of the hydrocarbons locked within the shale and hydrocarbon bearing formation. In such an instance, before new fractures can be produced within the well any points of fluid loss within the casing or within the formation are sealed off. If the various points of fluid loss are not sealed off the high-pressure fluid will merely proceed through the older fractures i.e. the path of least resistance. Temporarily blocking the fractures is desirable because it is rare for the older fractures to cease producing completely therefore after the well has been re-fraced operators usually prefer that the older fissures within the hydrocarbon bearing formation be reopened to continue producing so that every last drop can be removed from the well. Once the well has been treated to block off fluid leak points within the casing such as previous perforations etc. the well may be again fractured using a plug and pert or other operation.

In still other instances it may be desirable to block off the more permeable sections of the wellbore in order to treat other less permeable sections of the wellbore. For example, the flow path through one portion of a wellbore may become obstructed due to paraffin build up, asphalt build up or other issues within the wellbore. In such a case the more permeable sections of the wellbore are temporarily blocked off in order to force a treatment regime into the less permeable sections of the wellbore in order to restore circulation. Once the treatment is complete it is desirable for the more permeable section of the wellbore to be reopened to produce fluids in addition to the previously less permeable section of the wellbore.

GENERAL DESCRIPTION

An embodiment of the invention relates to manipulating the ratio of surface area to mass of particulant diverters for improved placement of the diverter at low fluid flow rates for simultaneous arrival of the particulant diverter downhole, preferably in low viscosity fluid. Generally, the shape of the particulate diverters is varied to maximize the bridging qualities of certain shapes with the compressive strength of other shapes. For instance, flakes or desired in order to bridge fluid flow paths while the beads are desired once the bridge is formed to provide sufficient compressive strength to actually seal the flowpath.

Generally, a low rate of fluid flow is a rate that will not allow suspension and transport of particles having a density greater than the density of the transport fluid. In essence high flow rates tend to keep the fluid turbulent and therefore tend to keep relatively dense particles suspended within the fluid while low flow rates tend to allow particles having a density greater than the transport fluid to settle out of the fluid. However, it should be noted that that particles having essentially the same density may settle out at different rates based upon the surface area relative to their mass.

Increasing the surface area relative to mass tends to allow transport at lower rates than other particle sizes. Ultimately a flake is more easily transported than a bead because the flake's surface area relative to its mass is greater than a bead's surface area relative to its mass. For example, a feather has a large surface area relative to its mass while a cannonball has a low surface area relative to its mass. Generally, in a fluid a first mass weight of feathers is more easily moved than an equivalent mass weight of cannonballs.

Diverters of the present invention are dissolvable materials. In particular, embodiments include dissolvable materials such as dissolvable polymers as well as dissolvable metals, including but not limited to polylactic acid, polyglycolic acid, magnesium, magnesium alloys, aluminum, and aluminum alloys. Embodiments of the invention includes dissolvable materials in flake form either alone or in conjunction with powder and/or beads.

DETAILED DESCRIPTION

Figure 1:
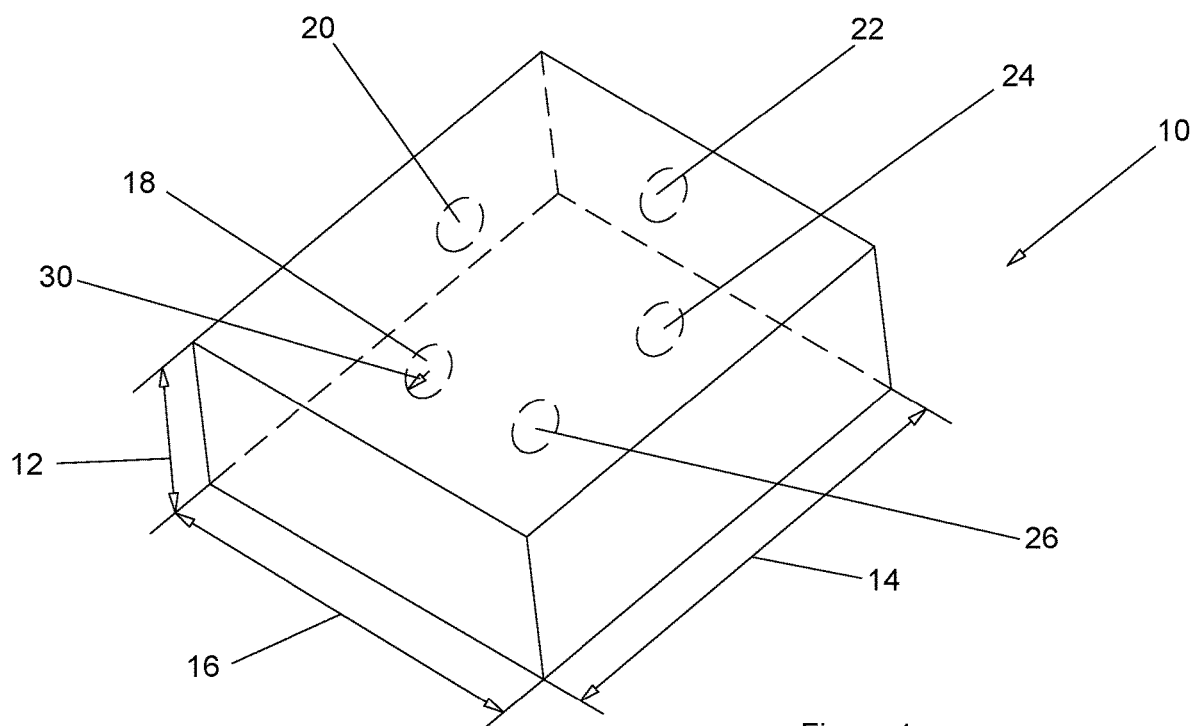
FIG. 1 depicts a dissolvable material that is manipulated in order to vary its surface area or general density with regard to its mass.

FIG. 1 depicts an embodiment of the invention where the dissolvable material is manipulated in order to vary its surface area or general density with regard to its mass. For example, a particle 10 of the dissolvable material has a height 12, a width 14, and a length 16. The particle 10 may be a material where the overall density of the particle 10 is controlled by the incorporation of less dense materials or by the inclusion of voids into the particle 10, such as by turning the material into a foam. For instance, the particle 10 has voids 18, 20, 22, 24, and 26. The total displacement of the voids within particle 10 is subtracted from the overall volume of particle 10 with the result then multiplied by the density of the dissolvable material to determine the overall density of the particle. The various embodiments may be utilized alone or in conjunction with other embodiments.

Figure 2:
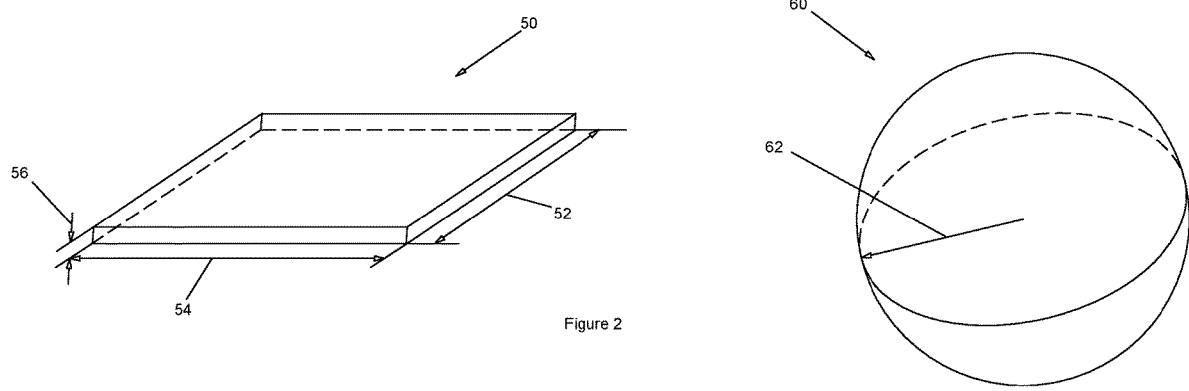
FIG. 2 depicts a flake of polylactic acid having a first mass and a bead of polylactic acid having a second mass.

FIG. 2 depicts a further example of a flake 50 of polylactic acid having a first mass, such as 1.3 grams, and a bead 60 of polylactic acid having a second mass of 1.3 grams. Because polylactic acid generally has a density of about 1.3 g/cm$^3$, both flake 50 and bead 60 have a volume of about 1 cm$^3$. In order to turn to determine the radius 62 of bead 60 the volume equation for a sphere may be used.

$$V_B = (4\pi r^3)/3$$

Where the volume of the bead 60 is known. In this case $V_B$ is 1 cm$^3$ giving a radius 62 of 0.62 cm.

Once the radius 62 of bead 60 is known we can determine the area of the bead 60 using the equation:

$$A_B = 4\pi r^2$$

Which leads to an area of the bead 60, $A_B$, of 4.83 cm$^2$.

Using a similar methodology, we can determine the area of flake 50 to provide a much higher area for a given volume. In this case the volume of the flake 50 may be determined by the formula:

$$V_F = L \times W \times H$$

Where length 52, L, is 2 cm and width 54, W, is 2 cm providing us with a height 56, H, of 0.25 cm.

Knowing the dimensions of flake 50 we can determine the area, $A_F$, of flake 50 using the formula:

$$A_F = 2 \times (L \times W) + 2 \times (L \times H) + 2 \times (W \times H)$$

Which leads to an area of the flake 50, $A_F$, of 10 cm$^2$.

In this example the flake 50 has more than twice the surface area of a bead 60 of an equivalent mass, of 1.3 g. It has been found that the preferred size of a flake 50 has a length of about 0.134 inches, a width of about 0.148 inches, and a thickness of about 0.02 inches although the length and width may range as high as 0.5 inches and as small as 0.1 inches. The particle thickness may range as low as 0.01 inches and as high as 0.05. The preferred size of the bead is about 0.125 inches.

In the event that both the 1.3 gram bead 60 and the 1.3 gram flake 50 are both placed in 2⅞ inch tubing with a low viscosity fluid flowing at 3 barrels per minute the 1.3 gram bead 60 is not able to be effectively placed while a 1.3 g flake 50 is able to be effectively placed at the desired location. In such an instance it may be desirable to foam or otherwise manipulate the bead 60 in order to either decrease its density or increase its surface area, $A_B$, so that the 1.3 g bead 60 has similar fluid transport characteristics as the 1.3 g flake 50.

Figures 3, 4:
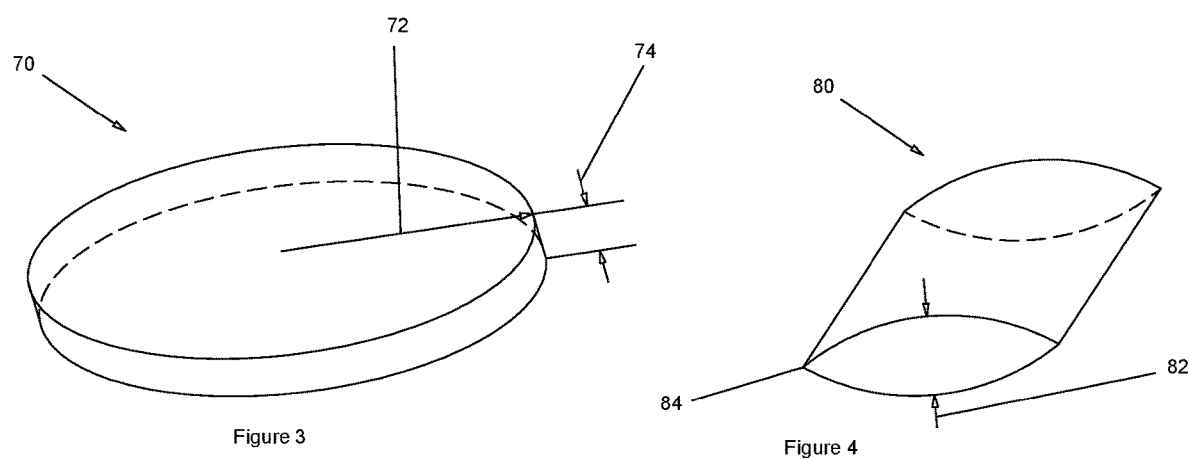
FIG. 3 depicts a disk of a diverter material.
FIG. 4 depicts a chiclet of a diverter material.

The fluid transport characteristics of the diverter may be manipulated by changing either the surface area of the diverter material, the density of the diverter material, or both. The transport properties of the diverter can be changed by forming the particles into various shapes in addition to the flake 50 and bead 60 of FIG. 2. FIG. 3 depicts a disk 70 of a diverter material where the disk 70 has a radius 72 and a thickness 74. FIG. 4 depicts a chiclet 80 having a thicker mid-section as compared to its side, in this case the mid-section has a thickness or height 82 and an edge or periphery thickness 80 that may vary from between 0% to as much as 25% of the height 82 of the diverter material. The density of the diverter may also be varied by inducing bubbles or including a second material having a non-homogenous density, such as air, within the material.

Preferably the diverter is utilized in conjunction with a low viscosity fluid, such as slick water. Generally slick water has no or a very low loading of viscosifier and is generally a Newtonian fluid. In such instances the transport effects of high surface area to mass increases with the reduction in viscosity. In an extreme example, in a cross-linked system, such as in a guar based non-newtonian fluid, the diverter particles are immune to settling regardless of their fluid transport characteristics. However, as viscosity drops the impact of the ratio of surface area to mass increases. In one embodiment particles are formed from a dissolvable polymer having variable internal density. In one instance density may be manipulated by mixing a less dense material with the polymer to decrease its density such as by mixing air into the polymer or other material. In other words, bubbles may be trapped within the material rendering the material less dense. In other instances, voids within the dissolvable polymer may be a vacuum. Similarly, in highly turbulent flow the diverter particles are immune to settling regardless of their fluid transport characteristics. While at the other extreme in a low viscosity fluid such as slick water, at low flow rates in laminar flow, the bead, where its density is not controlled, settles out of the fluid at low spots or other points where the beads may be trapped prior to reaching the desired location or at least tending to reach the desired location at some time after any particles having other transport properties have reached the location. Generally, water has a viscosity of about 1 centipoise at 20 degrees Celsius is a low viscosity fluid and low viscosity ranges from less than 1 to about 100 centipoise.

In general fluid flow having a high Reynolds number ("Re") has more turbulent flow and particles moving in such fluid flow are less dependent upon the fluid flow characteristics of the particles. The Reynolds number (Re) is a dimensionless quantity in fluid mechanics used to help predict flow patterns in different fluid flow situations. In general, a Reynolds number greater than 10,000 is indicative of turbulent flow, while a Reynolds number of less than 2000 is indicative of laminar flow. Re is generally defined as:

$$Re = \frac{\rho u D H}{\mu} = \frac{u D H}{v} = \frac{Q D H}{v A}$$

$D_H$ is the hydraulic diameter of the pipe (the inside diameter if the pipe is circular) (m).

Q is the volumetric flow rate (m³/s).

A is the pipe's cross-sectional area (m²).

u is the mean velocity of the fluid (m/s).

μ is the dynamic viscosity of the fluid (Pa·s=N·s/m²=kg/(m·s)).

v (nu) is the kinematic viscosity (v=μ/ρ) (m²/s).

ρ is the density of the fluid (kg/m³).

In an embodiment there is a first particle wherein the first particle has a density that is varied depending upon the viscosity. The first particle may be a bead having a variable internal density and a flake, wherein the flake has a surface area providing flow characteristics comparable to the flow characteristics of the bead. In certain instances, the flake may have a variable internal density. The fluid may be pumped at a flow rate dependent upon the density of the first particle, the transport properties of the flake, and/or the viscosity of the fluid.

In certain embodiments all of the particles do not have the same transport properties. In such cases the flakes tend to arrive first, then the dust, and then the beads. In such instances the flakes may be compared to a sailboat where due to the large surface area to mass ratio of the flakes the flakes mimic the flow rate of the fluid and therefore arrive first. The powder or dust arrive slightly after the flakes with the beads trailing behind. With the flakes arriving first and just prior to the powder. Flakes are then able to bridge off, the powder packs and seals while the beads give increased pressure tolerance. The flakes also enable bridging against the formation face.

In certain embodiments, for instance when used in uncemented liner applications, the thin cross section and elasticity of the material allow the flakes to deform and pass through the openings in the liner while allowing for bridging against the formation face.

In certain embodiments when used in openhole applications, the greater surface area results in more comprehensive coverage of the formation face, allowing a distinctly new fracture to develop.

The methods and materials described as being used in a particular embodiment may be used in any other embodiment. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of applying a diverter system to a well comprising:
    inserting a plurality of first particles and second particles into a fluid,
        wherein the first particles define a flake shape and the second particles define a bead shape,
        wherein the first particles have a surface area more than twice the surface area of the second particles,
        wherein the first particles and the second particles comprise at least a first dissolvable material,
        wherein the second particles are formed to incorporate within the second particles a second material of less density than the first dissolvable material to reduce the overall density of the second particles,
        wherein the reduced overall density of the second particles is less than a density of the first particles,
        wherein the fluid has a viscosity from 1 centipoise to about 100 centipoise,
    pumping the fluid into a wellbore at a flow rate such that the Reynolds number is less than 10000, and such that the first and second particles arrive simultaneously at a fracture within a hydrocarbon bearing formation.

2. The method of claim 1, wherein the first dissolvable material is polylactic acid.

3. The method of claim 1, wherein the first particles have a thickness of between 0.01 inches and 0.1 inches.

4. The method of claim 1, wherein the first particles have a thickness of between 0.015 inches and 0.025 inches.

5. The method of claim 1, wherein the second material of less density is air.

6. A method of applying a diverter system to a well comprising:
    inserting a plurality of first particles and second particles into a fluid,
        wherein the first particles define a flake shape and the second particles define a bead shape,
        wherein the first particles and the second particles comprise at least a first dissolvable material,
        wherein the second particles are formed to incorporate within the second particles a second material of less density than the first dissolvable material to reduce the overall density of the second particles,
    pumping the fluid into a wellbore to create a fluid flow, wherein the first particles have a surface area more than twice the surface area of the second particle, wherein the reduced overall density of the second particles is less than a density of the first particles and wherein a Reynolds number of the fluid flow is less than 10000, such that the first and second particles arrive simultaneously at a fracture within a hydrocarbon bearing formation.

7. The method of claim 6, wherein the first dissolvable material is polylactic acid.

8. The method of claim 6, wherein the first particles have a thickness of between 0.01 inches and 0.1 inches.

9. The method of claim 6, wherein the first particles have a thickness of between 0.015 inches and 0.025 inches.

10. The method of claim 6, wherein the reduced overall density of the second particles is within twenty five percent of the density of the first particles.

11. The method of claim 10, wherein the second material of less density is air.

12. The method of claim 6, wherein a viscosity of the fluid ranges from 1 centipoise to about 100 centipoise.

* * * * *